United States Patent [19]
Gammill, Jr.

[11] 3,838,782
[45] Oct. 1, 1974

[54] COTTON COMPRESSOR

[76] Inventor: Robert A. Gammill, Jr., Rt. 1, Tyronza, Ark. 72386

[22] Filed: Apr. 12, 1973

[21] Appl. No.: 350,584

[52] U.S. Cl.................. 214/41, 214/83.3, 100/278
[51] Int. Cl............................................ B65g 67/04
[58] Field of Search........ 214/83.3, 82, 41; 100/278

[56] References Cited
UNITED STATES PATENTS

| 230,053 | 7/1880 | Pridgen | 100/278 |
|---|---|---|---|
| 1,769,939 | 7/1930 | Berasi | 214/82 |
| 2,599,741 | 6/1952 | Bishman | 214/82 |
| 2,696,925 | 12/1954 | Laurin | 214/82 |
| 2,823,814 | 2/1958 | Schonroch | 214/82 |
| 3,720,328 | 3/1973 | Machenzie | 214/517 |

Primary Examiner—Robert J. Spar
Assistant Examiner—G. L. Auton
Attorney, Agent, or Firm—John R. Walker, III

[57] ABSTRACT

An apparatus for use with a tractor and a cotton trailer to compress cotton in the cotton trailer. The apparatus includes a winch mounted on the tractor, a drag slidably mounted in the cotton trailer, and a cable connecting the drag to the winch for pulling the drag towards the forward end of the cotton trailer to compress the cotton located between the drag and the forward end of the cotton trailer. A bumper is preferably mounted on the tractor to engage the front surface of the end of the cotton trailer for holding the cotton trailer in a fixed position relative to the winch when the drag is being pulled towards the forward end of the cotton trailer to prevent the cotton trailer from moving towards the winch.

5 Claims, 4 Drawing Figures

COTTON COMPRESSOR

BACKGROUND OF THE INVENTION

1. Field of the Invention

This invention relates to apparatuses for compressing cotton after the cotton has been introduced into a cotton trailer.

2. Description of the Prior Art

A preliminary patentability search revealed the following U.S. Pats.: Flato, No. 373,449; Haughton et al No. 379,645; Parrent et al No. 392,453; and Struensee et al No. 2,400,661. None of these references disclose or suggest applicant's invention.

The need for packing cotton in the cotton trailer to increase the relative volume of the cotton trailer is common knowledge to those skilled in the art. The most common method of compressing the cotton is manual. That is, one or more persons manually pack the cotton as it is placed in the cotton trailer with their hands and feet. Such a method is disadvantageous in that it is inefficient and expensive. More specifically, the cotton is not packed sufficiently by manual labor and the man-hours required are costly especially when compared to the benefits derived therefrom. One known apparatus for compressing cotton in a cotton trailer consists of a cotton press for attachment to a tractor. Such an apparatus comprises a boom, a packing foot, and a hydraulic ram-type activating means for driving the packing foot in a vertical, up and down motion to compress the cotton. Such an apparatus is disadvantageous in that its construction is relatively complicated and therefore expensive.

SUMMARY OF THE INVENTION

The present invention is directed towards overcoming the problems and disadvantages in the prior art. The concept of the present invention is to provide an inexpensive apparatus for efficiently compressing cotton in a cotton trailer.

The apparatus of the present invention includes a winch mounted on a tractor, a drag slidably mounted in a cotton trailer, and a cable connecting the drag to the winch. A bumper is preferably mounted on the tractor for engaging the front surface of the forward end of the cotton trailer for holding the cotton trailer in a fixed postion relative to the winch when the winch is pulling the drag towards the forward end of the cotton trailer thereby compressing the cotton located between the drag and the forward wall of the cotton trailer to prevent the cotton trailer from moving towards the winch.

DESCRIPTION OF THE PREFERRED EMBODIMENT

Figure 1:
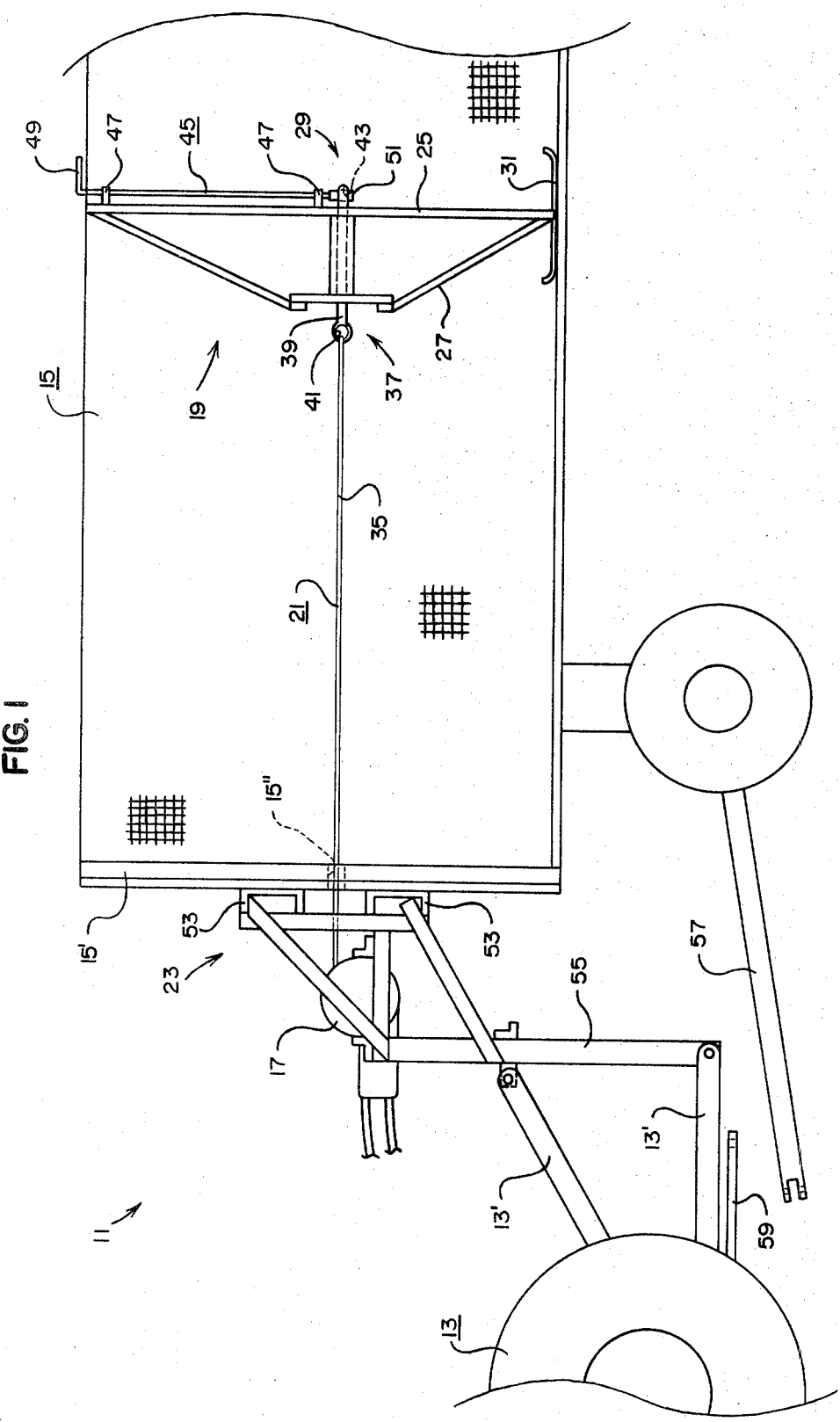
FIG. 1 is a side elevational view of the cotton compressor of the present invention showing it mounted on a tractor and positioned in a cotton trailer.
Figure 2:
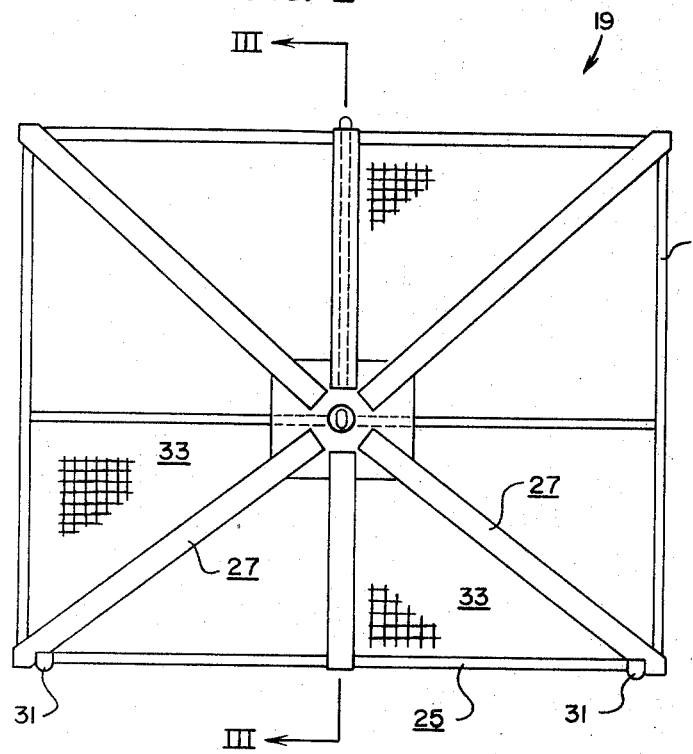
FIG. 2 is a front view of the drag of the present invention.
Figure 3:
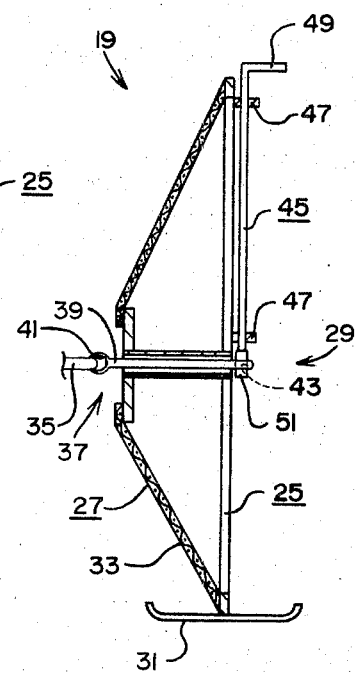
FIG. 3 is a sectional view of the drag of the present invention as taken on line III—III of FIG. 2.
Figure 4:
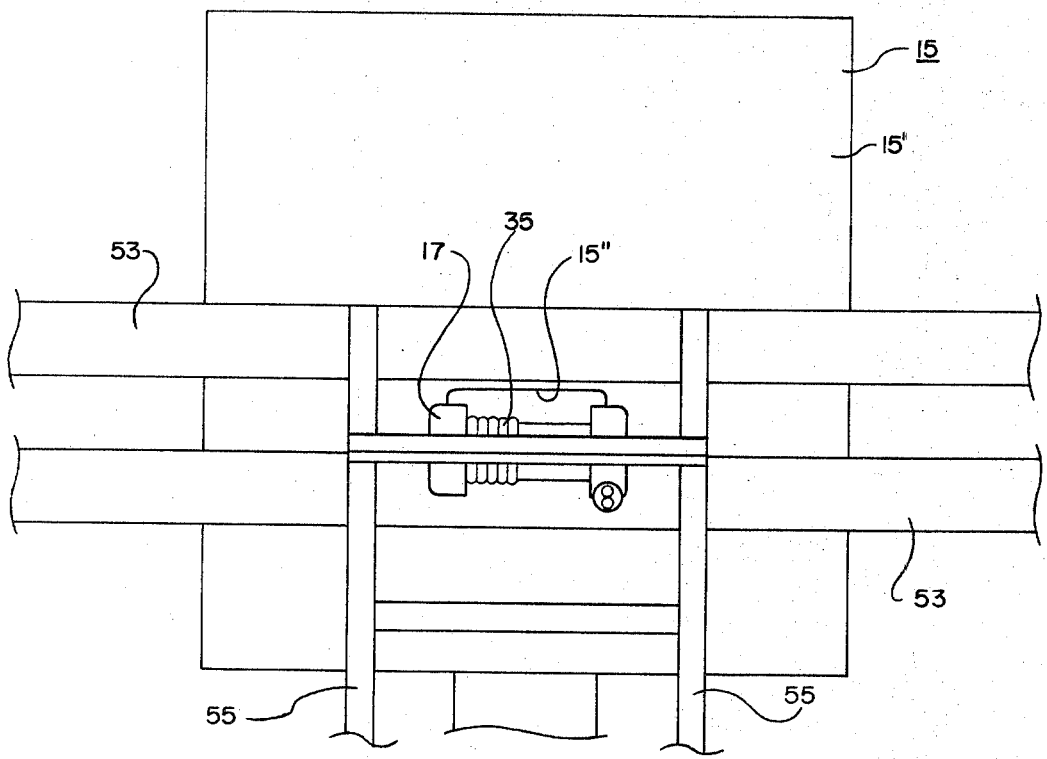
FIG. 4 is a front elevational view of the cotton compressor positioned in a cotton trailer with some parts removed for clarity.

The cotton compressor 11 of the present invention is for use with a tractor 13 and a cotton trailer 15. The cotton trailer 15 includes a forward end 15' having an opening 15". The cotton compressor 11 includes a winch 17 preferably mounted on the tractor 13, drag means 19 movably mounted in the cotton trailer 15, and cable means 21 passing through the opening 15" in the forward end 15' of the cotton trailer 15 for connecting the drag means 19 to the winch 17. When activated, the winch 17 forces the cable means 21 to pull the drag means 19 towards the forward end 15' of the cotton trailer 15 thereby compressing the cotton located between the drag means 19 and the forward end 15' of the cotton trailer. Preferably a holding means 23 is mounted on the tractor 13 to engage the front surface of the forward end 15' of the cotton trailer 15 to hold the cotton trailer 15 in a fixed position relative to the winch 17 when the drag means 19 is being pulled towards the forward end 15' of the cotton trailer 15 thereby preventing the cotton trailer 15 from being pulled towards the winch means 17.

The drag means 19 includes a frame portion 25 for supporting the drag means 19 in the cotton trailer 15, a body portion 27 for engaging the cotton to compress the cotton against the forward end 15' of the cotton trailer 15, and lock means 29 for detachably locking the cable means 21 to the drag means 19. The frame portion 25 of the drag means 19 includes slide members 31 for contacting the cotton trailer 15 to allow the drag means 19 to slide towards the forward end 15' of the cotton trailer 15. The slide members 31 are preferably elongated to hold the drag means 19 steady as it is pulled towards the forward end 15' of the cotton trailer 15. A skin member 33 is preferably positioned over the body portion 27 of the drag means 19 to provide more uniform compressive force against the cotton. The skin member 33 preferably consists of an open mesh wire screen.

The cable means 21 includes a flexible cable 35 attached to the winch 17 and includes attaching means 37 for removably attaching the flexible cable 35 to the lock means 29 of the drag means 19. The attaching means 37 includes a connector 39 having a first aperture 41 for allowing the flexible cable 35 to pass therethrough and having a second aperture 43 for allowing a portion of the lock means 29 to pass therethrough. The lock means 29 includes a rod 45 movably attached to the frame portion 25 of the drag means 19 by lugs 47. The rod 45 includes a handle portion 49 and a connector engaging portion 51. The connector engaging portion 51 is adapted to pass through the second aperture 43 of the connector 39 to lock the connector 39 to the drag means 19. The handle portion 49 allows manual engagement of the connector engaging portion 51 to the connector 39.

The holding means 23 includes a bumper member 53 adjustably supported on the tractor 13 for engaging the front surface of the forward end 15' of the cotton trailer 15. The bumper member 53 and the winch 17 are preferably mounted on support structure 55 which is in turn mounted on the tractor 13. The support structure 55 is preferably mounted on the standard three-point hitch 13' of the tractor 13. Such a method of attachment allows the winch 17 and the holding means 23 to be adjusted with respect to different sizes of cotton trailers 15. In other words, for use with various sizes of cotton trailers 15 the winch 17 may need to be raised or lowered to align the cable means 21 with the opening 15'' in the forward end 15' of the cotton trailer and the bumper member 53 may need to be raised or lowered to position it so that it uniformly engages the front surface of the forward end 15' of the cotton trailer 15.

The operation of the cotton compressor 11 is quite simple. First, the tractor 13 is positioned adjacent the cotton trailer 15 with the bumper member 53 engaging the front surface of the forward end 15' of the cotton trailer 15. The cable means 21 is positioned through the opening 15'' in the forward end 15' of the cotton trailer 15 and the connector 39 is attached to the drag means 19 by the lock means 29. The drag means 19 is positioned towards the rear of the cotton trailer 15. Cotton may then be dumped between the forward end 15' of the cotton trailer 15 and the drag means 19 from a mechanical cotton picker or the like. The winch 17 is then activated, preferably by the hydraulic system of the tractor 13, to pull the drag means 19 towards the forward end 15' of the cotton trailer 15 thereby compressing the cotton located between the drag means 19 and the forward end 15' of the cotton trailer. The cable means 21 is then slackened, the drag means 19 manually pulled rearwardly, and the above procedure repeated until the cotton trailer 15 is full.

If the cotton trailer 15 should need moving while partly loaded, the cable means 21 can be slackened and the tractor 13 moved forward relative to the cotton trailer 15. The trailer tongue 57 can then be connected to the tractor drawbar 59. After the cotton trailer 15 is moved, the trailer tongue 57 is disconnected from the tractor drawbar 59 and the tractor 13 is positioned so that the bumper member 53 again engages the front surface of the forward end 15' of the cotton trailer 15.

After the cotton trailer 15 is fully loaded, the handle portion 49 of the rod 45 is manually raised to release the cable means 21 from the drag means 19. The winch 17 is then activated to pull the cable means 21 through the opening 15'' in the forward end 15' of the cotton trailer. The drag means 19 may then either be left in the full cotton trailer 15 or removed therefrom.

Although the invention has been described and illustrated with respect to a preferred embodiment thereof, it is not to be so limited since changes and modifications may be made therein which are within the full intended scope of the invention.

I claim:

1. In combination with a tractor having an adjustable hitch; a cotton trailer having a forward end; and of apparatus for compressing cotton in the cotton trailer, said apparatus comprising drag means movably mounted in the cotton trailer for compressing the cotton against the forward end of the cotton trailer, a tractor operable winch for selectively driving said drag means, said winch being attached to said adjustable hitch whereby the height of said winch may selectively be varied, cable means interconnecting said drag means and said winch for selectively pulling said drag means towards the forward end of the cotton trailer thereby compressing the cotton placed therebetween, said forward end being provided with an aperture with said cable means freely passing therethrough, and holding means for selectively engaging the forward ends of a plurality of different sizes of cotton trailers and for bracing the engaged cotton trailer in a fixed position relative to said winch when said winch is activated to pull said drag means toward the forward end of the cotton trailer, said holding means being attached to said adjustable hitch whereby the height thereof may selectively be varied simultaneously with said winch.

2. The apparatus of claim 1 in which said drag means comprises:
   a. a frame portion for supporting said drag means in the cotton trailer,
   b. a body portion for compressing the cotton against the end of the cotton trailer, and
   c. lock means for detachably locking said cable means to said drag means.

3. The apparatus of claim 2 in which said frame portion includes slide members for contacting the floor of the cotton trailer to allow said drag means to slide towards the end of the cotton trailer when pulled by said cable means.

4. The apparatus of claim 2 in which a skin member is positioned over said body portion of said drag means for providing more uniform compressive force against the cotton.

5. The apparatus of claim 2 in which said cable means comprises:
   a. a flexible cable attached to said winch, and
   b. attaching means for removably attaching said flexible cable to said lock means of said drag means.

* * * * *